US 6,671,776 B1

(12) United States Patent
DeKoning

(10) Patent No.: US 6,671,776 B1
(45) Date of Patent: Dec. 30, 2003

(54) METHOD AND SYSTEM FOR DETERMINING AND DISPLAYING THE TOPOLOGY OF A STORAGE ARRAY NETWORK HAVING MULTIPLE HOSTS AND COMPUTER READABLE MEDIUM FOR GENERATING THE TOPOLOGY

(75) Inventor: Rodney Allen DeKoning, August, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/490,383

(22) Filed: Jan. 24, 2000

Related U.S. Application Data

(63) Continuation-in-part of application No. 09/431,715, filed on Oct. 28, 1999.

(51) Int. Cl.⁷ .............................................. G06F 12/00
(52) U.S. Cl. ........................ 711/114; 711/202; 714/6; 710/38
(58) Field of Search .......................... 711/4, 112–114, 711/202–209; 714/6, 9; 710/5, 38

(56) References Cited

U.S. PATENT DOCUMENTS

| | | | | | |
|---|---|---|---|---|---|
| 4,396,984 | A | * | 8/1983 | Videki, II | 710/38 |
| 5,301,297 | A | | 4/1994 | Menon et al. | 711/114 |
| 5,787,463 | A | | 7/1998 | Gajjar | 711/114 |
| 5,790,775 | A | * | 8/1998 | Marks et al. | 714/9 |
| 5,812,754 | A | * | 9/1998 | Lui et al. | 714/6 |
| 5,883,621 | A | * | 3/1999 | Iwamura | 345/327 |
| 5,938,744 | A | | 8/1999 | Roganti et al. | 710/25 |
| 5,973,690 | A | * | 10/1999 | Ofer et al. | 345/340 |
| 6,173,339 | B1 | * | 1/2001 | Yorimitsu | 710/5 |
| 6,260,120 | B1 | * | 7/2001 | Blumenau et al. | 711/152 |
| 6,343,324 | B1 | * | 1/2002 | Hubis et al. | 709/229 |

OTHER PUBLICATIONS

Danahy, P., "DISK/OPTICALStorage *RAB*™ Fibre Channel RAID In SANs", *Computer Technology Review*, 5 pgs. (Sep. 1998).

"MetaStor Storage Solutions Announces Channel Alliance Partner Program For SAN (Storage Area Network)—based Storage Solutions," *LSI Logic Source Systems, Inc.*, Press Release, 2 pgs. (Sep. 13, 1999).

"MetaStor Storage Solutions Announces Open SAN (Storage Area Network) Initiative", *LSI Logic Source Systems, Inc.*, Press Release, 3 pgs. (Sep. 13, 1999).

* cited by examiner

*Primary Examiner*—Nasser Moazzami
(74) *Attorney, Agent, or Firm*—The Law Offices of William W. Cochran, LLC

(57) ABSTRACT

A system and method for dynamically generating the topology of a storage array network by linking information concerning hosts and clusters along with information about host port adapters. Namely, each host identifies itself to all controllers and provides information in a command that allows the controller to know which host and cluster, if applicable, is associated with the host port adapter through which the command was issued. In addition, the topology is automatically updated anytime there is a change on the network such as a new device was added or a host port adapter was replaced.

21 Claims, 9 Drawing Sheets

METHOD AND SYSTEM FOR DETERMINING AND DISPLAYING THE TOPOLOGY OF A STORAGE ARRAY NETWORK HAVING MULTIPLE HOSTS AND COMPUTER READABLE MEDIUM FOR GENERATING THE TOPOLOGY

RELATED APPLICATION

The present application is a continuation-in-part of U.S. Ser. No. 09/431,715 entitled "Method and System For Partitioning a Storage Array in a Storage Array Network," filed Oct. 28, 1999 which is hereby incorporated by reference.

FIELD OF THE INVENTION

The present invention is directed to storage array technology, and, more particularly, to storage array technology that automatically determines the topology of a storage array network including the association of host port adapters, hosts and cluster groups.

BACKGROUND OF THE INVENTION

Although still an evolving, Storage Area Networks (SANs) promise to revolutionize the majority in which storage are coupled in the years to come. Today, the vast majority of host systems are directly attached to the storage that they use. With storage area metworking, storage and hosts will no longer be so closely coupled. Instead, system architects will be able to engineer configurations that answer some requirements and, in the future, will be able to answer even more of the myriad of requirements that have, to date, been only answerable by proprietary storage solutions.

SANs offer system designers a whole new way of approaching storage. Traditionally, the host-storage interface has been closely coupled. In fact, the only time that small computer system interface (SCSI) storage has been successfully attached to multiple hosts is in the case of clustered central processing units. The reason for this is simple, the SCSI protocol was not developed with the idea of multiple heterogeneous hosts sharing the same SCSI cable. Because SCSI has been relatively limited in its speed and the ability to address a large amount of disk capacity on SCSI does not exist, the idea of sharing storage between a number of hosts on the SCSI interface has not traditionally been a driving factor.

There are a number of reasons why end users see value in sharing storage between a number of hosts. One of the primary reasons is that the investment in storage can be amortized across multiple hosts. This is an important consideration today, since the expense of storage is a significant factor in the cost associated with a system installation. This is particularly true in cases where multiple small capacity hosts require highly available storage such as Redundant Array of Independent Disks (RAID). Another factor is storage consolidation. By enabling a variety of hosts to attach to a single, large array, management and maintenance costs are reduced, positively impacting the total cost of storage ownership. A third factor is standardization. Instead of forcing system administrators to work with storage arrays from multiple vendors, standardization provides a single, centralized management system capable of managing storage throughout the SAN.

One approach to creating a shared SAN is the use of specially developed access control software run on the storage array itself. This software controls host access to storage within the array on a logical unit number (LUN) basis, based on the actual fibre channel address of the host. Essentially a table driven access control, this solution is able to map host access requests to storage associated with that host exclusively or inclusively, depending on the configuration and application requirements. In essence, the host only sees what the access control software on the array allows it to see, removing from its view all other storage in the array. For example, it can be possible to share a 1TB RAID array across ten hosts, each of which believes the array only has 100GB of capacity. By implementing management of the software control in the array's storage management utilities, the solution can be made fully host independent.

A disadvantage in today's SCSI and fibre channel storage connect environment is the inability to automatically determine the topology of a network and convey that topology to a system administrator, for example, in a user-friendly manner. Currently host port adapters are provided with a unique identification (I.D.), such as a worldwide name (WWN). This information is transmitted to a storage array controller to identify the adapter through which a command was issued. Unfortunately, if a host has multiple adapters, information concerning the host is not conveyed. Thus, apart from manually checking, there is no way to know what adapter is associated with what host. Moreover, if hosts are grouped in clusters, associating an adapter with a cluster is not automatically possible. Without this information, it is very time consuming to determine the topology of the network. Currently, to provide a system administrator with information concerning the topology of a network, a mapping of the host port adapters to the hosts and clusters must be done manually. This is a time consuming proposition as storage array networks become more complex and is prone to errors. In addition, if changes are made to the topology of the network such as replacing a failed adapter, the administrator must manually map the WWN of the replacement adapter into the existing topology. Thus, the topology reflected to the administrator can become outdated without the administrator's knowledge.

It is thus desirable to provide an automated method and system for determining the topology of a storage array network and conveying that topology to an administrator in a user friendly fashion. It is also desirable to provide a method and system for automatically updating the topology whenever changes are made to the topology. It is also desirable to provide an administrator with a view of the current topology at a remote location from which the administrator can make changes to the topology.

SUMMARY OF THE INVENTION

According to a first aspect of the invention there is provided a method of transmitting information from which a topology of a storage array network having multiple hosts, with at least one host having a plurality of host port adapters, may be determined. The method includes the steps of:

(a) generating a command from a host wherein the command includes a unique host identifier and a unique host port adapter identifier wherein the unique host identifier is linked to the unique host port adapter identifier; and (b) transmitting the command from the host to a controller of a storage array network through a first path coupling the host port adapter to the controller.

According to a second aspect of the invention, there is provided a storage array network including:

a plurality of hosts;

a storage array having multiple volumes;

a storage array controller operatively coupled to the storage array;

a bus operatively coupling each host to the storage array controller, wherein each of the plurality of hosts transmits to the storage array controller a command that includes a unique host identifier and a unique host port adapter identifier.

According to a third aspect of the invention, there is provided a computer readable medium for generating a topology of a storage array network. The medium includes:

code that represents a table of unique identifiers of a plurality of hosts and unique identifiers of a plurality of host port adapters associated with each of the plurality of hosts; and code that utilizes the table to generate a display of the topology of the network.

According to a fourth aspect of the invention, there is provided a system for determining a topology of a storage array network having multiple hosts with at least one host having a plurality of host port adapters, the system comprising:

a general purpose computing device; and a computer program comprising one or more program modules executable by the computing device;

wherein the program modules comprises a table module for uniquely associating each host and its host adapter port with a controller via a path and a topology module that utilizes the table module to generate a topology of the network.

DETAILED DESCRIPTION

Figure 1:
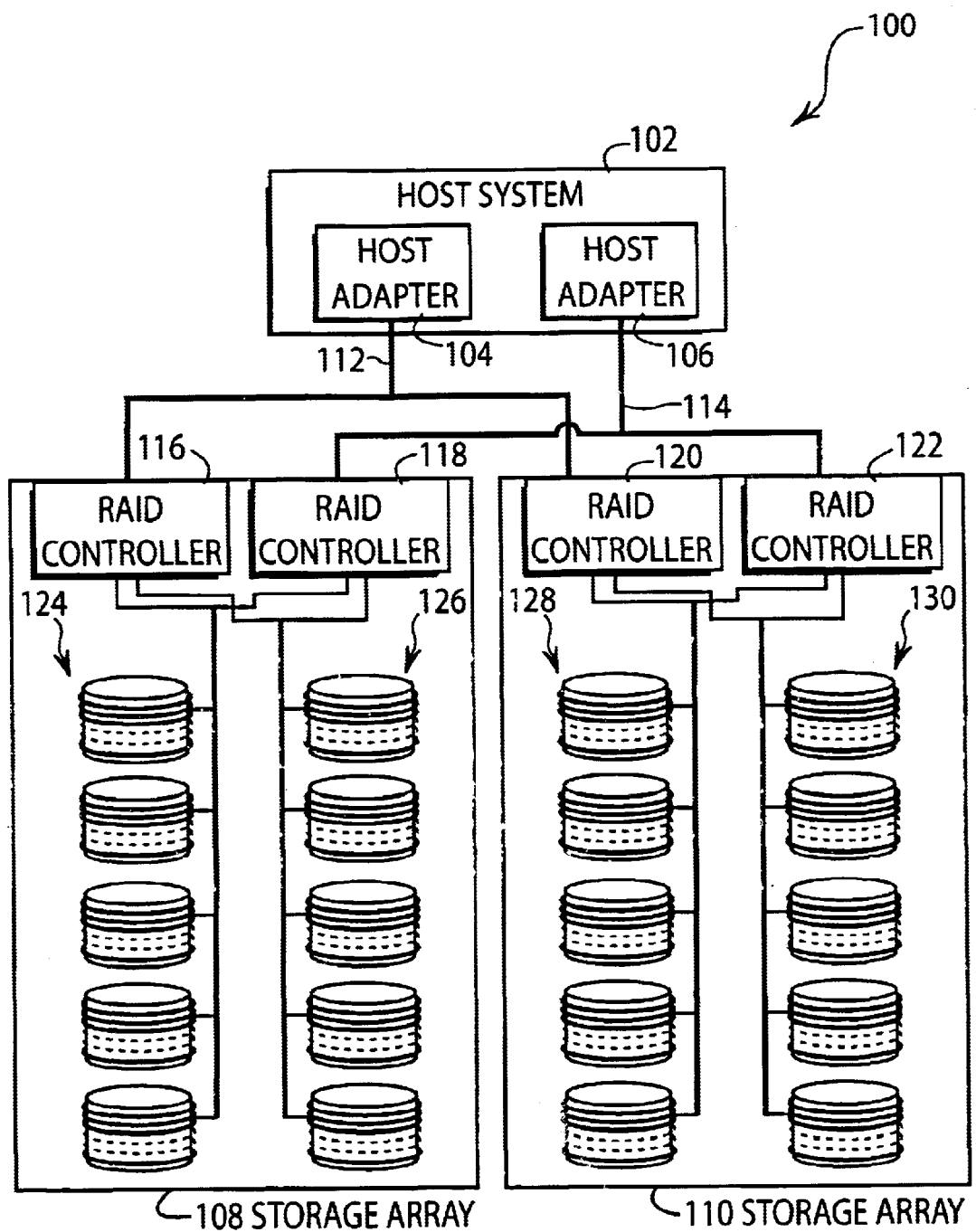
FIG. 1 illustrates a data storage system according to a preferred embodiment of the present invention.

FIG. 1 illustrates a data storage system 100 according to a preferred embodiment of the present invention. A host system 102 or server is coupled by host adapters 104 and 106 to storage arrays 108 and 110 by host buses 112 and 114. While the host system 102 is preferably a personal computer (or "PC" type) or server computer system, it should be clearly understood that the present invention is equally suitable for use with other computing environments not specifically disclosed herein including mainframe computers, minicomputers and SAN bridges. In a preferred embodiment, the host system 102 includes at least one x86 microprocessor and acts as a server in a distributed computing environment. The host buses 112 and 114 are preferably well-known SCSI buses. Alternatively, other bus architectures may be employed in embodiments of the invention, including without limitation fiber channel or Peripheral Component Interconnect (PCI).

RAID controllers 116, 118, 120 and 122, preferably represent low end RAID controllers operatively coupling a host adapter (e.g., host adapter 104) to a storage array, such as storage array 108. Intervening devices or interconnections may also be disposed between the host adapter and the storage array. In an alternative embodiment, each RAID controller in the data storage system may be replaced with PCI RAID controllers or other low end RAID controllers.

In the illustrated embodiment of FIG. 1, RAID controller 116, for example, preferably provides a level of RAID functionality, disk caching, and environmental monitoring. The RAID controller 116 presents its own volumes to the host adapter 104 and maps logical units numbers (LUNs) appropriately to the data stored in storage array 108 as will be described in detail hereinafter. In a typical scenario, the RAID controller 116 "stripes" a volume across all five storage disks of disk arrays 124 and 126 to provide RAID 0 functionality as is well known. RAID controller 118 presents volumes mapped to disk arrays 124 and 126 to provide dual access to the storage arrays. In a similar manner, the RAID controller 120 presents volumes mapped to disk arrays 128 and 130. Controllers 120 and 122 are redundant controller pairs as are controllers 116 and 118.

FIG. 1 also illustrates an example of redundant controllers. That is, a drive in array 126 may be accessed by either controller 116 or 118. Therefore, if one or the other controller fails, a host system may still access the drive through the remaining controller.

It can be difficult for a system administrator to manage a complex storage area network without having access to the topology of the network. The present invention provides a dynamic method and system for automatically determining the topology of a storage array network. This makes it possible for a network. In addition as changes are made to the topology of the network, the present invention automatically changes the generated topology to reflect those changes and present the administrator with a most current view of the network's topology.

Figure 2:
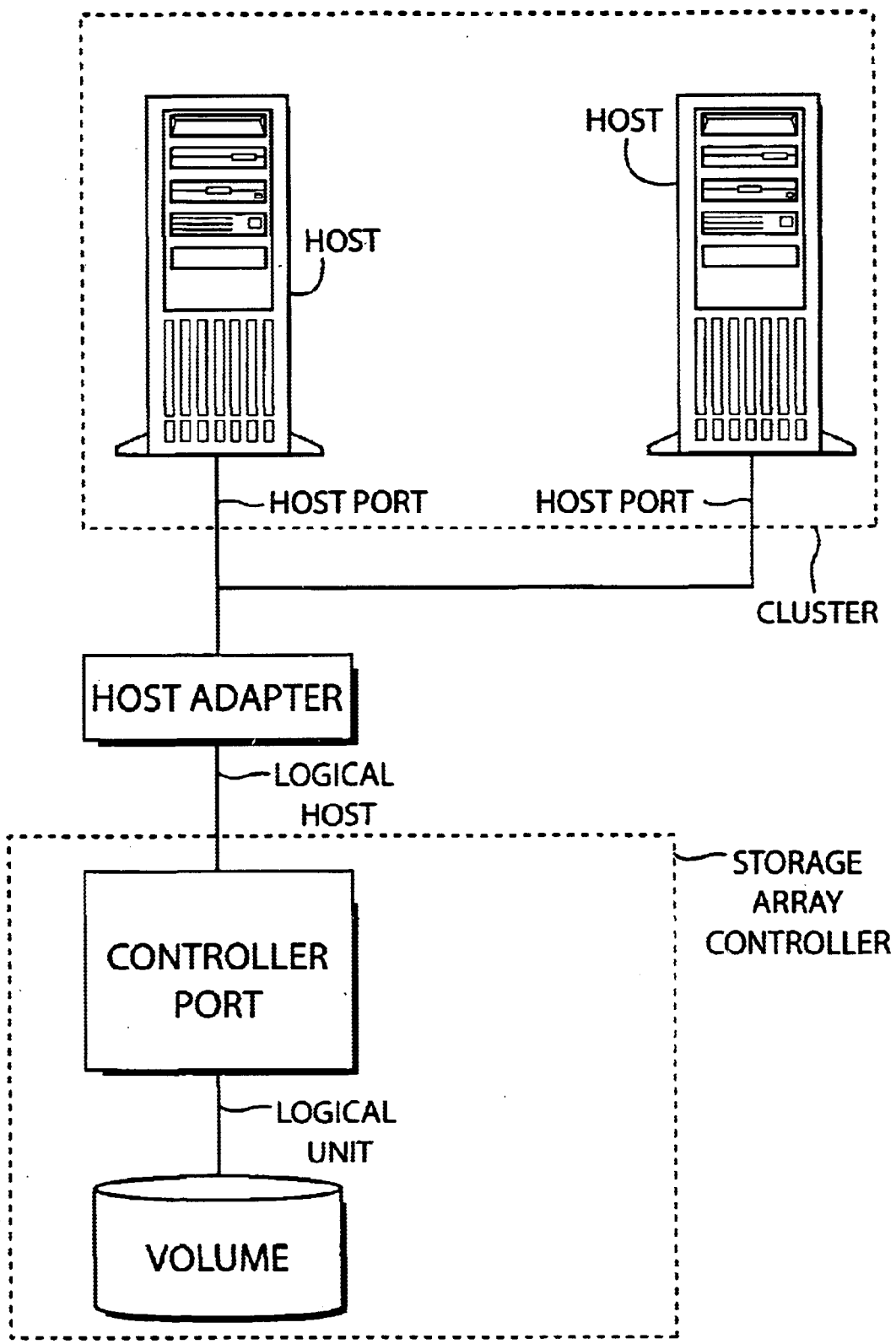
FIG. 2 is a schematic illustration of the definitions given in Table 1.

For the purpose of clearly describing the present invention, it is helpful to define several terms in Table 1 below and with reference to FIG. 2.

| | |
|---|---|
| Logical Unit Number (LUN) | A "Logical Unit Number" (LUN) is redefined from its customary meaning to be part of the addressing mechanism that is used by the host to access the volume. The association between the LUN and the volume is arbitrary for a HOST ID - Controller Port Storage path. The LUN can be assigned by an administrator configuring the storage array as will be described hereinafter. |

Figure 3:
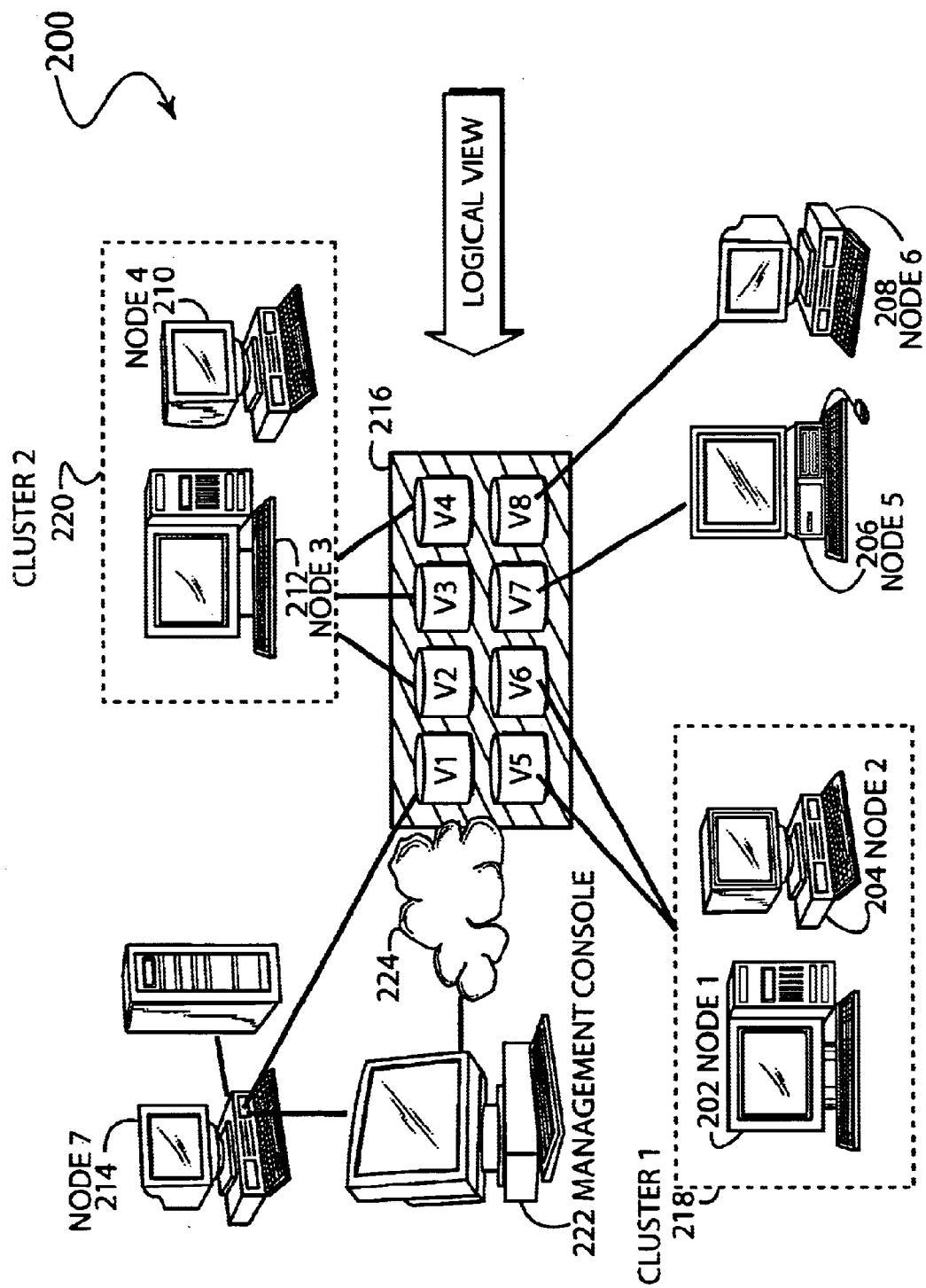
FIG. 3 is a schematic of a SAN storage consolidation according to a preferred embodiment of the present invention.

FIG. 3 is a schematic of a SAN storage area network 200 according to a preferred embodiment of the present invention. The storage area network 200 includes a plurality of nodes 202–214 operatively coupled to a storage array 216.

At each node is a host or server that is operatively coupled to the storage array 216. Nodes 202 and 204 are grouped together as a first cluster 218 and nodes 210 and 212 are grouped together as a second cluster 220. The storage array 216 is represented logically as having eight he volumes that are coupled to the nodes.

A management console 222 is coupled to the storage array 216 preferably by a network 224. Network 224 may be an Ethernet, LAN, or the World Wide Web, for example. In a preferred embodiment the management console 222 is LSI's Logic SyMsm7 Enterprise Storage Manager. The management console 222 utilizes Java based software and has a web-based graphical user interface running on a browser such as Microsoft Internet Explorer or Netscape's Navigator. SyMsm7 is a trademark of LSI Logic Corporation of Milpitas, Calif. Internet Explorer is a trademark of Microsoft Corporation of Redmond, Washington. Navigator is a trademark of Netscape Corporation of Mountain View, Calif.

Using the management console, a system administrator, for example, can provide on-line administration to allow configuration, maintenance, reconfiguration and performance monitoring of the storage area network. In a preferred embodiment, a user is provided with two views of the storage array network through the management console 222. The first view is an enterprise storage array discovery and monitoring view which provides a way for discovery and gross level monitoring of the storage arrays that are part of the identified enterprise configuration. The second view is a storage array management view which allows for the configuration and monitoring of a particular storage array. The storage array management view is used to partition the storage according to a preferred embodiment of the present invention as will be described hereinafter. The management console 222 may be connected to the storage array network either directly as shown or through the hosts themselves. Alternatively, the management console manager may be resident on one or more of the hosts attached to the storage array network. Regardless of where the management console resides, the manager will provide a description of the entire storage array network including storage partitioning volume mappings as will be described in detail hereinafter.

Figure 4:
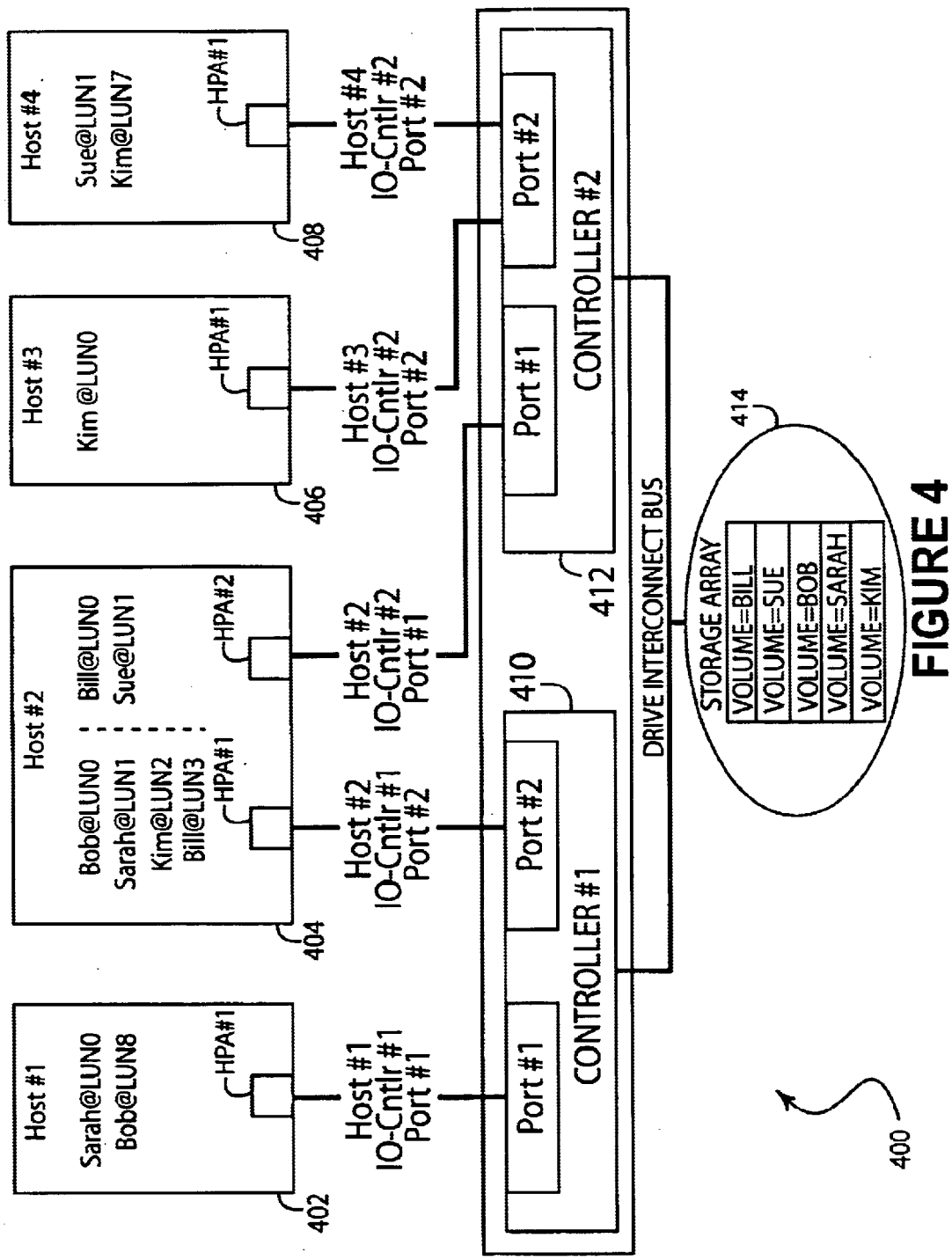
FIG. 4 is a schematic diagram of a topology according to a preferred embodiment of the present invention.

FIG. 4 is a schematic diagram of a topology 400 according to a preferred embodiment of the present invention. The topology includes four hosts 402–408 and two controllers 410, 412. Hosts 402 and 404 are grouped in a first cluster 401. It will be appreciated that the topology of a network may includes more than four hosts, two controllers and one cluster and the present invention is not limited to the particular embodiment illustrated. In this preferred embodiment, each controller has a first port and a second port. All of the hosts except host #2 (404) have a single host port adapter (HPA). The storage array 414 has five volumes associated therewith. The hosts are configured so that host #1 (402) has access to the volume "Sarah" through the first port of the first controller 410 at LUN O as well as access to the volume "Bob" through the first port of the first controller 410 at LUN 8. Host #2 (404) has two host port adapters. The first port adapter HPA #1 has access to the volume "Bob" through the second port of the first controller at LUN0.

In addition, the same path is used to access the volume "Sarah" at LUN 1, "Kim" at LUN 2, and "Bill" at LUN 3. The second host port adapter of Host #2 (404) has access to the volume "Bill" through the first port on the second controller at LUN 0. In addition, the same path is used to access the volume "Sue" at LUN 1. Table 2 below illustrates the five different host ID-controller port storage paths shown in FIG. 4.

In addition, clustering information may also be conveyed. For example, some clustering software supplies cluster name information that can be transmitted to the storage array controllers and input into the data maintained by the controllers which is used to dynamically generate the topology of the network. Alternatively, cluster information can be entered manually as is well known.

| Host | HPA | Controller # | Controller Port # | Storage Path Name | Volumes Assigned to LUN # |
|---|---|---|---|---|---|
| #2 | #1 | #1 | #2 | Host #2 ID-Controller #1-Port #2 | Bob to LUN 0<br>Sarah to LUN 1<br>Kim to LUN 2<br>Bill to LUN 3 |

As can be seen in FIG. 4, in the case of the volume labeled 'Bob', both Host #1 and Host #2 have access to 'Bob' through the same controller, but through different ports and at different LUN addresses in that Host's address space. This may be useful if volume 'Bob' is a boot disk for one of the two hosts, but is not the boot device for the other. Host #3 and Host #4 are attached to the storage subsystem using the same controller port, but each has its own LUN address space, i.e. Host #3 is assigned only volume 'Kim' at LUN 0, whereas, Host #4 is assigned 'Sue' at LUN 1 and 'Kim' at LUN 7. This may be useful in allowing each host to address the volumes it needs to access without taking up a LUN slot for a volume it does not, or should not, need to access. This is also useful to provide security to prevent one host from inappropriately seeing data of another host. Host #2 is the only host in the example with multiple ports into the storage subsystem. In this case, the first interface is labeled storage path 'Host #2 ID—Controller #1 Port #2' connecting the host to the first controller's second port. The second interface to the storage subsystem is labeled storage path 'Host #2 ID—Controller #2 Port #1' connecting the host to the second controller's first port. Each storage path is provided its own Logical Unit Address Space. Storage path 'Host #2 ID—Controller #1 Port #2' has been assigned volume 'Bob' at LUN 0, while storage path 'Host #2 ID—Controller 2 Port #1' has been assigned 'Bill' at LUN 0 and 'Sue' at LUN 1. Host #2, HPA #2 has also been assigned Sarah @ LUN 1, Kim @ LUN 2 and Bill @ LUN 3. This may be useful in providing multiple paths to the same storage for the server, thus avoiding single points of failure other than the server itself. In Table 2, the host #ID represents the world wide name of the HPA that uniquely identifies the HPA to the controller.

Each host has an application resident thereon that provides topology information to the storage array controllers. At initiation of the network or whenever a change is sensed to the network, for example, a new device was added or a host port adapter was replaced, each host performs an identification process with every controller on the network. More particularly, each host discovers which controllers support the functionality of dynamically generating a topology of the network according to the invention. Each host then discovers all of the paths it has to access the controllers that support the topological functionality. Each host then sends a command preferably in the form of a fibre channel packet along every path it has coupling it to the controllers. The packet has a header, payload and trailer section. The header contains the world wide name of the host port adapter through which the command was sent. The payload contains information about the unique host identifier, cluster data, if applicable, as well as host type. The trailer section contains crc error information. By providing the information in this form, the host port adapter is linked with the host and cluster, if applicable so now it is known which host and cluster the host port adapter is associated with. The controller is also provided with information concerning what path was used to transmit the packet and what controller port received the packet. The controller keeps a table of this information which can be read out of the controller by the management console to dynamically generate the topology of the network as shown at 702 of FIG. 8. Preferably, the management console has software resident thereon for using the information to generate a display of the topology on a screen of the management console.

If a change is made to the topology of the network such as a host port adapter is replaced or swapped, a command from the host application using the replaced adapter will supply all of the controllers with all of the information they need to modify topology accordingly.

Figure 5:
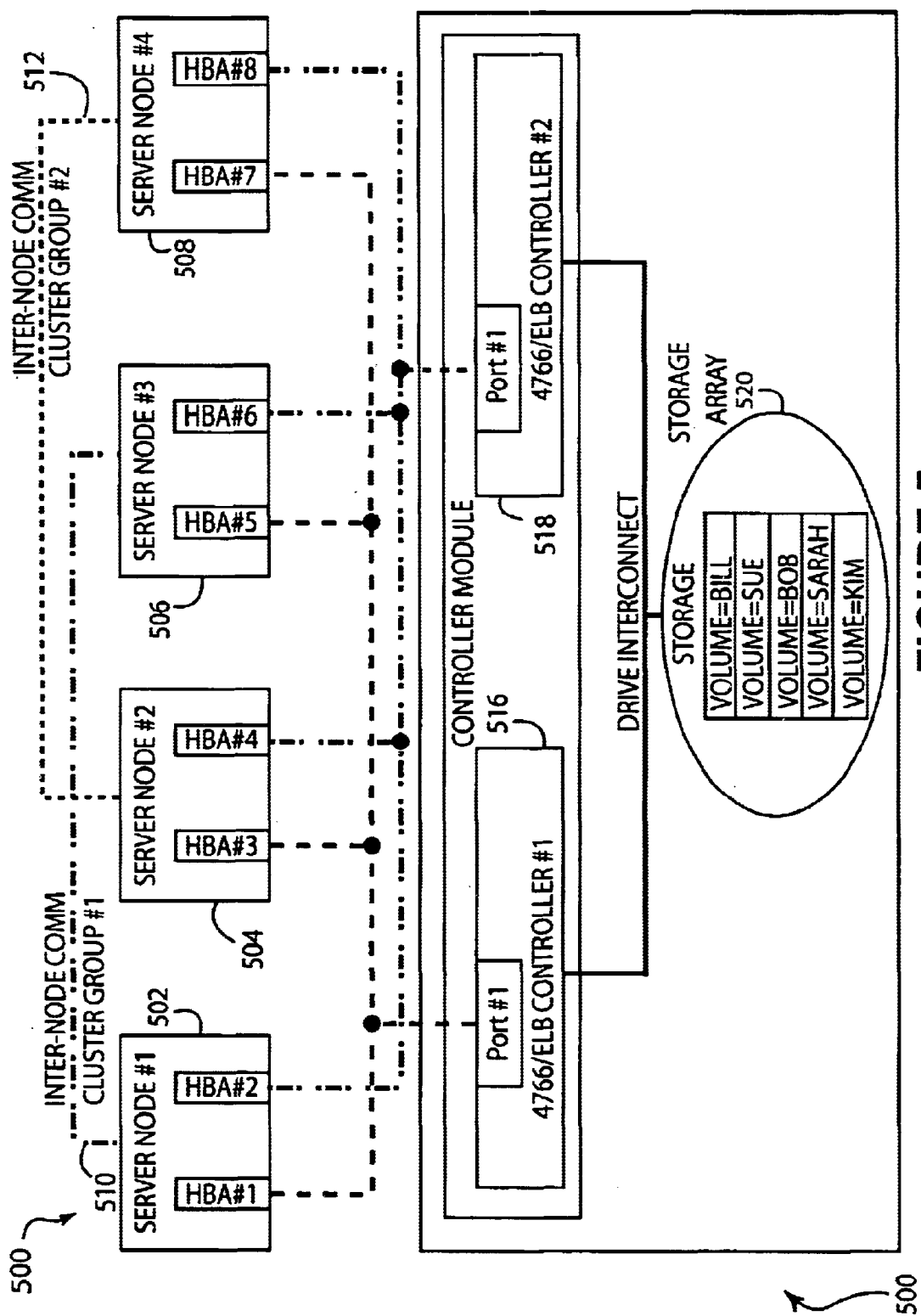
FIG. 5 is a schematic diagram of a multiple cluster, single port controller, redundant path topology.
Figure 6:
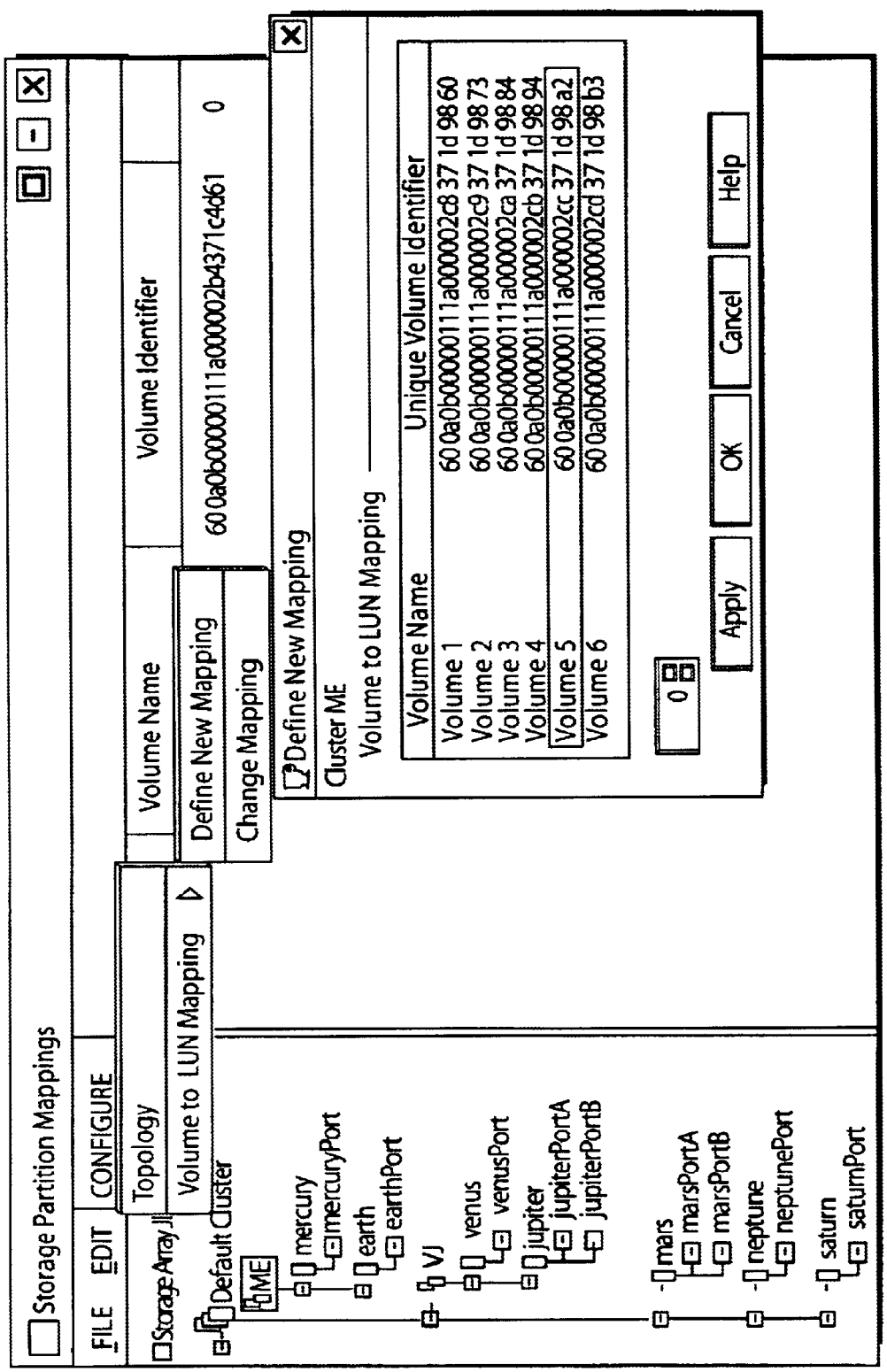
FIG. 6 illustrates a screen that can be displayed on the management console to display the configured topology of the SAN to a system administrator.

FIG. 5 is a schematic diagram of a multiple cluster, single port controller, redundant path topology 500. This topology may be used to share the storage array amongst two or more clusters. In this particular embodiment, server nodes 502, 506 are grouped into a first cluster 510 and server nodes 504, 508 are grouped into a second cluster 512. Each cluster group is provided its own pair of ports to access the storage array 520. The primary objective in this environment is to amortize the cost of the storage array across the multiple server cluster groups that are attached to the storage array, consolidate the management of the storage associated with the clustered servers attached to the storage array, provide the necessary LUN space environments for each of the clustered servers attached to the storage array, and provide simple cabling and integration for storage sharing of a multiple cluster group environment.

When configuring the storage partitions for multiple server clusters, the primary consideration is in providing the set of hosts in a cluster a single volume to LUN mapping. When configuring redundant controller configurations of the multiple cluster group configuration, it is required that the volume to LUN mappings are configured consistently for the multiple host adapter ports associated with that cluster group. This is to provide ease of management and also to support current operating system limitations and clustering applications with regard to LUN management. The cluster name is provided through a menu on the management console that provides the list of cluster names provided by the user. These cluster names represent collections of host adapters that have been configured by the administrator to be associated with the named clustered hosts.

As a clustered multiple port configuration example with reference to FIG. 5, assume that Cluster Group #1 (510) wishes to have access to Volume 'Bill'. To allow Cluster Group #1 to access 'Bill' using the storage array ports connected to Cluster Group #1, the Logical Unit Number (LUN) to address 'Bill' should currently be the same for the host ports in the cluster group accessing the volume. Assuming Logical Unit Number=4 was chosen, the following entries would be required in the storage array controller storage partitioning volume to LUN Mapping Table:

| Cluster Group 1 | Volume ID | Nexus LUN ID |
|---|---|---|
| HPA #1 | Bill | 4 |
| HPA #2 | Bill | 4 |
| HPA #3 | Bill | 4 |
| HPA #4 | Bill | 4 |

Figure 7:
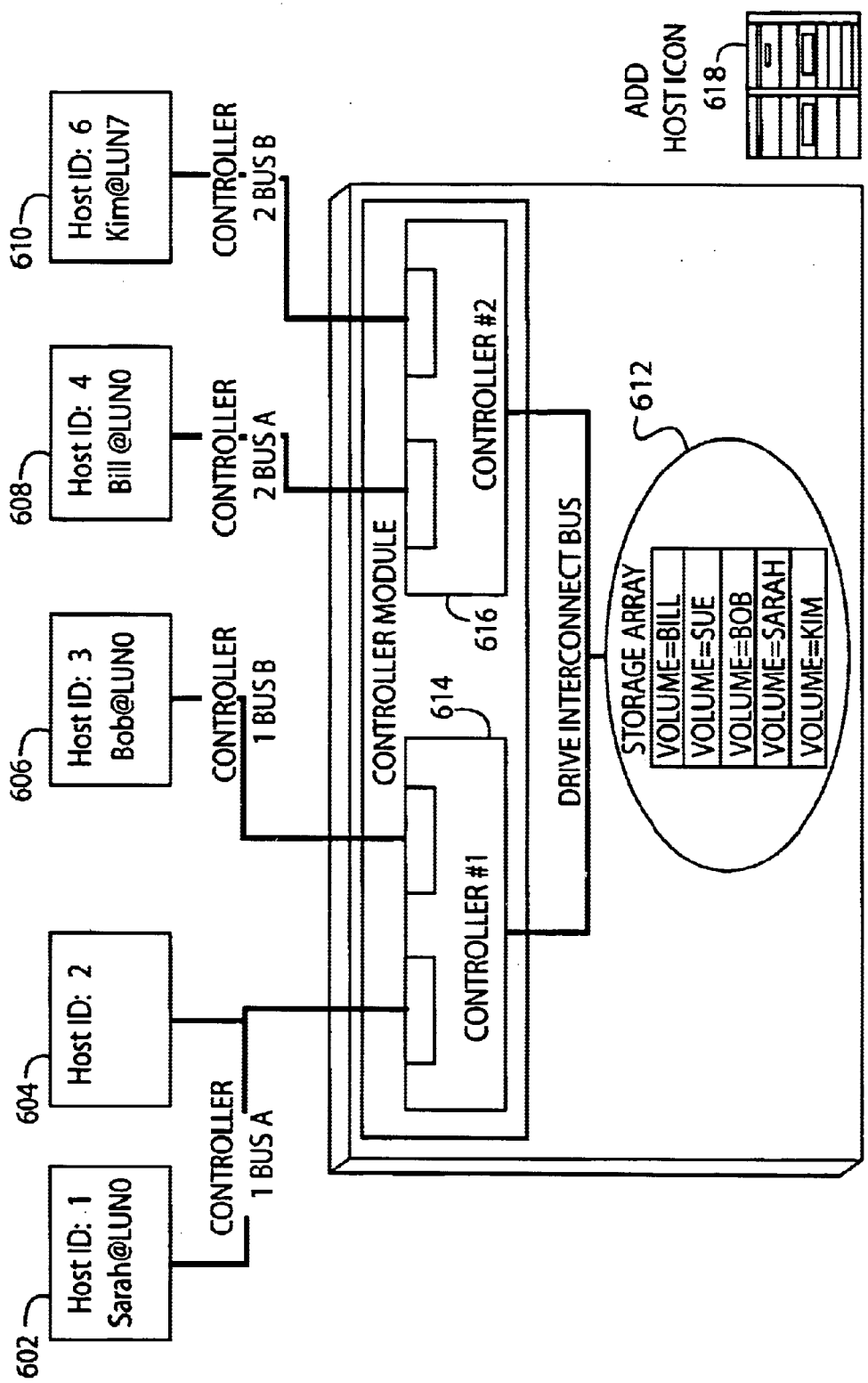
FIG. 7 is a display screen that can be displayed at the management console for partitioning storage in a storage array network.

A user such as a system administrator is provided a pictorial representation of the SAN topology through the management console 222 (FIG. 3) and the user can dynamically assign volumes to hosts as needed. FIG. 7 illustrates a screen that may be displayed on the management console 222 to display the configured topology of the SAN to a system administrator. In this particular embodiment, five hosts 602–610 are operatively coupled to the storage subsystem 612 via two controllers 614, 616, each controller having two controller ports. Additional hosts can be operatively coupled to the storage subsystem by using the "Add Host" Icon 618. Volumes are then assigned to the host as needed preferably using a drag and drop type interface that prompts the user for parameters that are needed.

Figure 8:
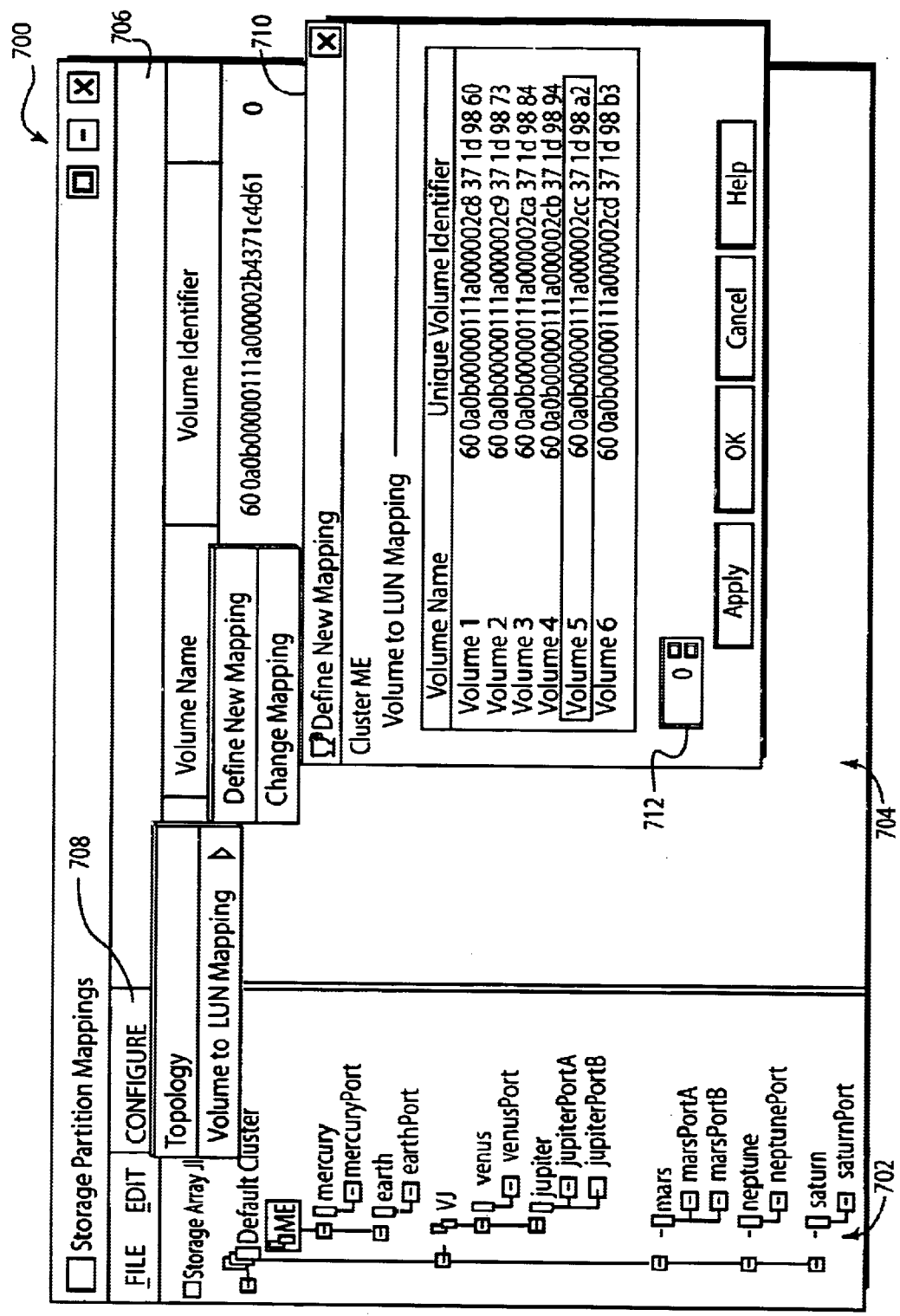
FIG. 8 is a display screen defining a user interface that can be displayed on the management console that allows a user to create a new volume.

FIG. 8 is a display screen 700 that can be displayed at the management console. As can be seen in the left hand column of the primary window 704, a list of hosts along with their ports is shown as well as any cluster information. It can be seen that clusters "ME" and "VJ" each have two hosts. Host "Mercury", "Earth" and "Venus" each have one port whereas hosts "Jupiter" and "Mars" have two ports. The administrator can select a host or cluster by merely clicking on the host or cluster in the left window 702. It can be seen from the screen displayed in FIG. 8 that the cluster "ME" has been selected. The administrator can then select from a menu bar what information or actions the administrator would like to access. As shown in the menu bar 706 of the display screen, the "Configure" menu 708 has been selected from the main menu. The "Configure" menu has two submenus, i.e. "topology" and "volume-to-LUN mapping." If the administrator selects the topology submenu then a screen is displayed (not shown) from which the administrator can configure the topology of the network. For example, the administrator can change cluster groupings. The administrator can also assign volumes to clusters and hosts. In addition, the administrator can configure the volume to LUN mappings as was described in detail in U.S. Ser. No. 09/431,745 referred to above.

With the present invention, a user, such as a system administrator, can view all the logical and physical components of a storage array. The system administrator can view, monitor, configure and reconfigure the entire storage array. Access is provided to all storage partitions defined in the storage array, and monitoring includes all events associated with the storage array. This view is useful in environments in which the storage array is administrated by a central administrator for all the hosts or clusters configuring or monitoring the storage array. Alternatively, a system administrator may be provided with a view of only the logical and physical components associated with a particular host or group of hosts. From this view, the system administrator can view and monitor only the logical units and physical components that are defined to affect the performance, reliability, and availability of the storage defined to be a part of a particular storage partition definition. This view is useful in environments in which the storage array is administrated by multiple administrators; each administrator only having a view of the storage array as appropriate for the storage partition seen by that host or cluster.

To prevent accidental or malicious tampering with Volume to LUN mappings, a minimal security mechanism is required. Preferably, a password is required to enter a volume to LUN mapping. Another form of security that would be acceptable as a supplemental approach would be to provide a volume level password that would protect the volume to LUN mapping on a volume basis.

Figure 9:
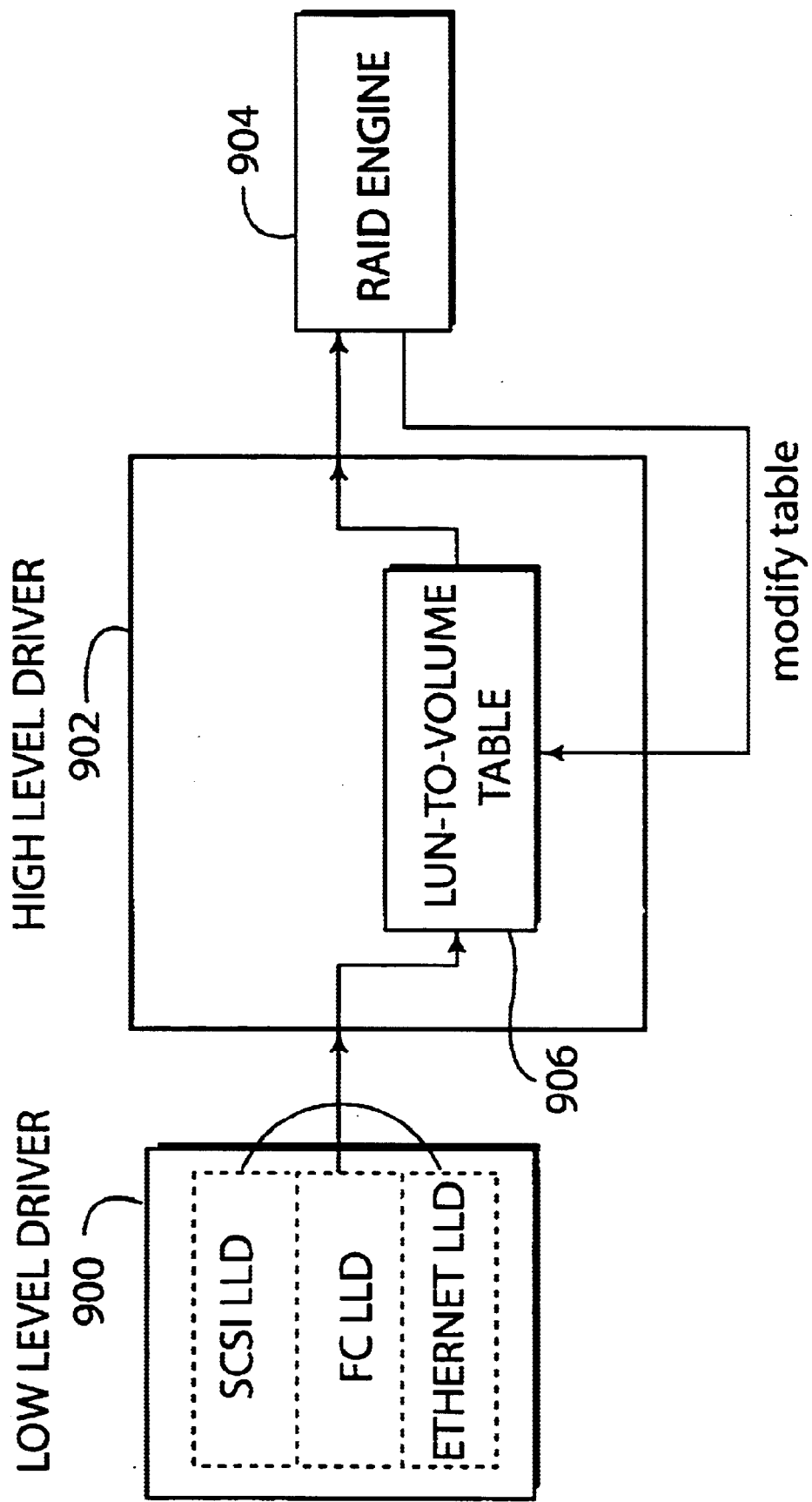
FIG. 9 is a block diagram of control logic according to a preferred embodiment used to access the SAN.

FIG. 9 is a block diagram of control logic according to a preferred embodiment used to access the SAN. This control logic is software that is run on the storage array controllers. It includes a low level driver 900, a high level driver 902 and a RAID engine 904 which is a piece of software that performs RAID management. Raid engine 904 can be made up of several different elements including a microprocessor and dedicated logic. Stored within the high level driver 902 or source driver is a LUN-to-volume table 906. The low level driver 900 receives I/O requests from a plurality of hosts. In this particular embodiment, inputs from SCSI hosts, Fiber Channel (FC) hosts and Ethernet hosts are received. The LUN-to-volume mapping table 906 is required within the source driver to allow commands issued for specified LUNs to be routed to the proper volume (physical storage unit) as seen by the RAID engine.

Advantageously, the present invention allows the high cost of highly available storage arrays to be spread across multiple server environments. In addition, because the cost is spread across multiple server environments, systems in the smaller, low cost server environments can have access to the much needed highly availability features of these storage arrays.

In addition, the administrator is allowed to define the partitions of storage such that each volume is accessible only to the hosts that the administrator has enabled them to be accessed. For instance, two different hosts servicing different departments such as the finance and the human resources departments may use the same storage subsystem without having access to one another's department data.

Finally, the topology of the network is automatically determined and conveyed to the administrator.

The above specification, examples and data provide a complete description of the manufacture and use of the composition of the invention. Since many embodiments of the invention can be made without departing from the spirit and scope of the invention, the invention resides in the claims hereafter appended.

What is claimed is:

1. A method of transmitting information from which a topology of a storage array network having multiple hosts, with at east one host having a plurality of host port adapters, may be determined, the method comprising:

generating a command from a host wherein the command includes a unique host identifier and a unique host port adapter identifier wherein the unique host identifier is linked to the unique host port adapter identifier; and transmitting the command from the host to a controller of the storage array network through a first path coupling the host port adapter to the controller.

2. The method of claim 1 further comprising:

storing in the controller of the storage array network, a table of information concerning the command generated and the first path coupling the host port adapter to the controller; and transmitting the table of information stored in the controller to a remote computing device.

3. The method of claim 2 further comprising:

generating the topology of the storage array network from the table of information.

4. The method of claim 3 further comprising:

transmitting from the remote computing device commands to reconfigure the storage array network.

5. The method of claim 2 further comprising:

displaying the topology.

6. The method of claim 2 further comprising:

displaying the topology on a display remotely located from the storage array network.

7. A computer-readable medium having computer-executable instructions for the method recited in claim 1.

8. A computer data signal embodied in a carrier wave readable by a computing system and encoding a computer program of instructions for executing a computer process performing the method recited in claim 1.

9. A method according to claim 1 further comprising:

transmitting the command from the host to the controller through each path coupling the plurality of host port adapters to the controller.

10. The method of claim 1 further comprising:

generating the command from a host wherein the command includes a unique host identifier and a unique host port adapter identifier that is linked to the unique host identifier whenever the host port adapter is replaced with another host port adapter; and transmitting the command to the controller of the storage array network through a first path coupling the host port adapter to the controller.

11. A storage array network comprising:

a plurality of hosts;

a storage array having multiple volumes;

a storage array controller operatively coupled to the storage array; and a bus operatively coupling each host to the storage array controller, wherein each of the plurality of hosts transmits to the storage array controller a command that includes a unique host identifier and a unique host port adapter identifier.

12. The network of claim 11 wherein a path of the bus that operatively couples the storage array controller to a host is also transmitted to the controller.

13. The network of claim 11 wherein each host has a utility application resident on a processor of the host that designates the unique host identifier.

14. The network of claim 11 wherein the storage array controller has a memory that stores a table of information including the unique host identifier and the unique host adapter port identifier.

15. The network of claim 14 further comprising computing device operatively coupled to the plurality of hosts and the storage array controller wherein the computing device receives the table stored by the storage array controller and generates a topology of the network.

16. The network of claim 15 wherein the computing device is remotely located from the plurality of hosts and storage array controller.

17. The network of claim 15 further comprising a display operatively coupled to the computing device for displaying the topology of the network.

18. The network of claim 17 further comprising an input means for inputting commands to change the configuration of the topology wherein the computing device receives the inputs, generates a commanded action and downloads the commanded action to the storage array controller which implements the commanded action.

19. The network of claim 18 wherein the computing device is in a personal computer and the input device is a keyboard.

20. A computer readable medium containing a program for generating a topology of a storage array network, the program comprising:

code that accesses topology information from at least one storage array controller and that creates a table of unique identifiers of a plurality of hosts and unique identifiers of a plurality of host port adapters associated with each of the plurality of hosts; and code that utilizes the table to generate a display of the topology of the network.

21. A system for determining a topology of a storage array network having multiple hosts with at least one host having a plurality of host port adapters, the system comprising:

a general purpose computing device; and a computer program comprising two or more program modules executable by the computing device;

wherein the program modules comprise a table module that accesses at least one storage array controller and retrieves information that associates a host and its host port adapter with the controller via a path and a topology module that utilizes the table module to generate a topology of the network.

* * * * *